Aug. 14, 1928.

W. F. CLARK 1,681,099

PORTABLE MELTING POT

Filed April 14, 1924  2 Sheets-Sheet 1

Inventor:
Warren F. Clark.
Thurston Kwis & Hudson
attys.

Aug. 14, 1928.
W. F. CLARK
1,681,099
PORTABLE MELTING POT
Filed April 14, 1924    2 Sheets-Sheet 2
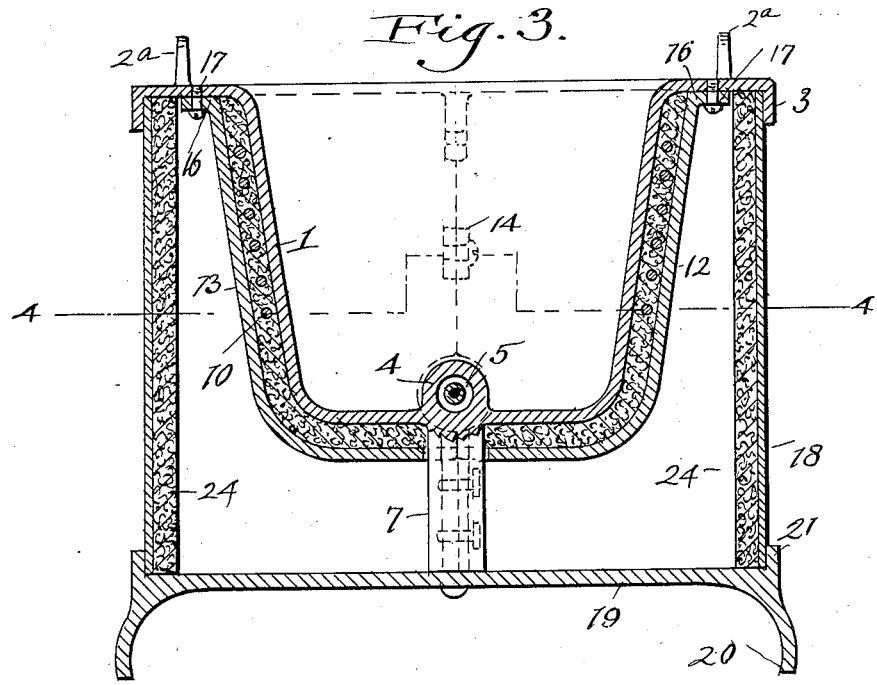
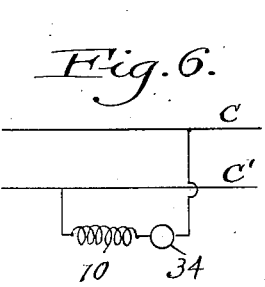
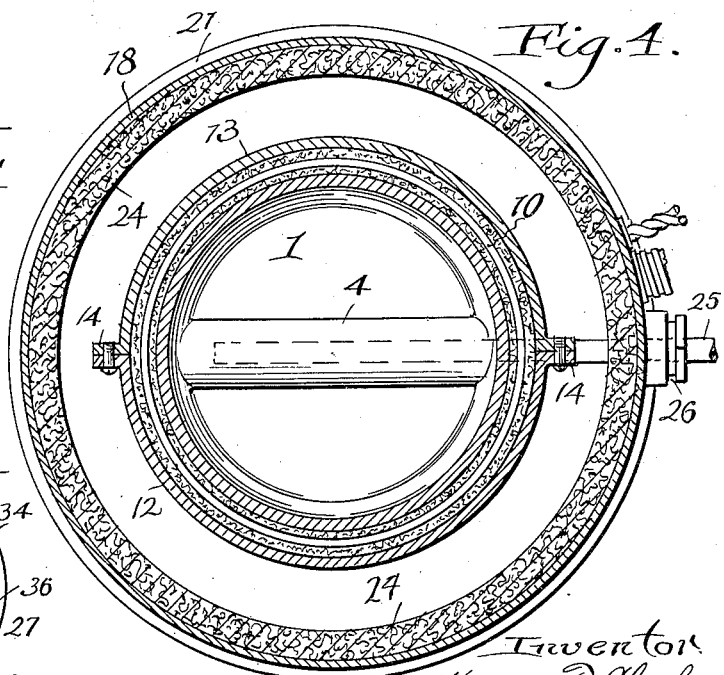
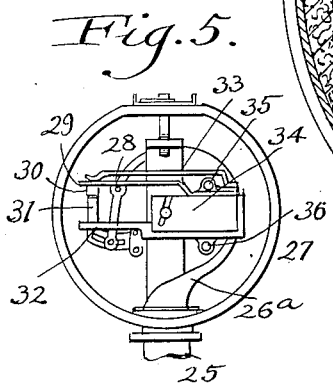

Patented Aug. 14, 1928.

1,681,099

UNITED STATES PATENT OFFICE.

WARREN F. CLARK, OF WARREN, PENNSYLVANIA, ASSIGNOR TO AUTOMATIC ELECTRIC HEATER COMPANY, OF WARREN, PENNSYLVANIA, A CORPORATION OF DELAWARE.

PORTABLE MELTING POT.

Application filed April 14, 1924. Serial No. 706,350.

This invention relates to an electrically heated melting pot which is more particularly adapted for the heating of solder, Babbitt metal, white metal, wax, and similar substances which do not circulate while heating.

One of the objects of the invention is to produce an electrically heated crucible in which the entire outside surface of the crucible is directly heated.

A further object of the invention is to provide in connection with the electric heating element of such a melting pot, a control device whereby the temperature of the substance being heated may be accurately controlled, this being a very necessary reqirement in devices of this kind, because certain of the materials mentioned will oxidize and so become worthless for use, if they are heated beyond a well known and definite temperature.

A further object of the invention is to provide an electrically heated pot of the character described in which the heating element is suitably protected against damage incident to the use of the melting pot, which is frequently submitted to rather rough treatment in connection with its use.

A further object of the invention is to provide a device of the character described in which the melting pot and all the parts associated therewith are a unitary and self-contained structure.

Figure 1:
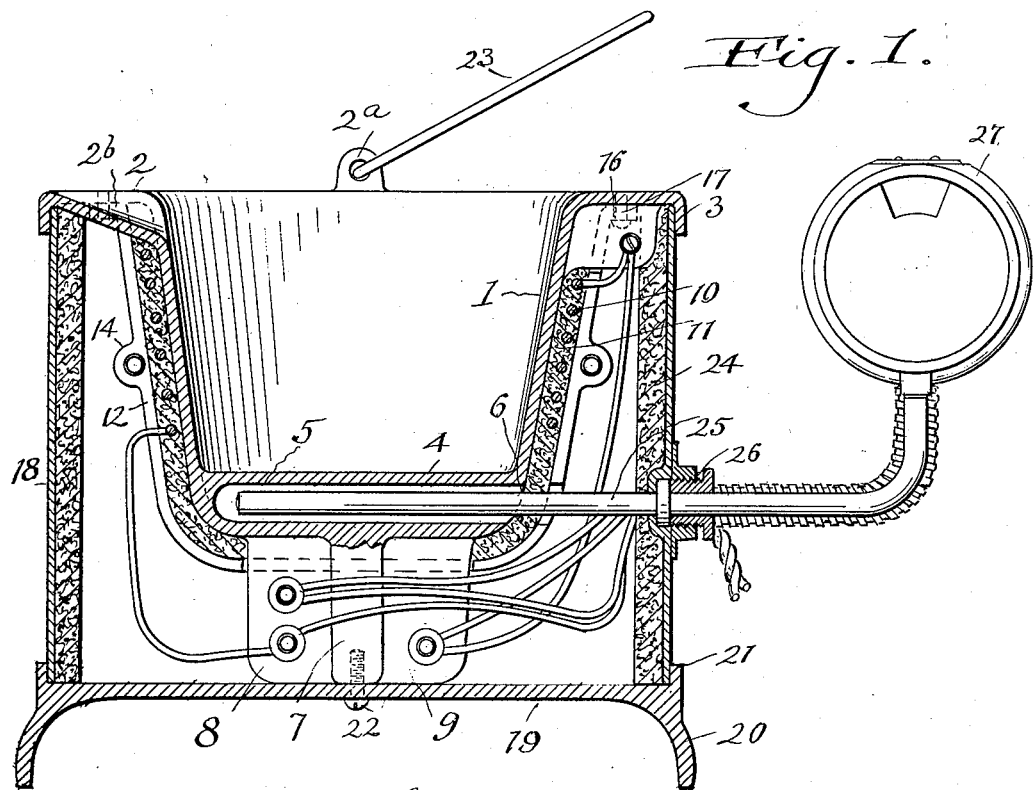
Figure 2:
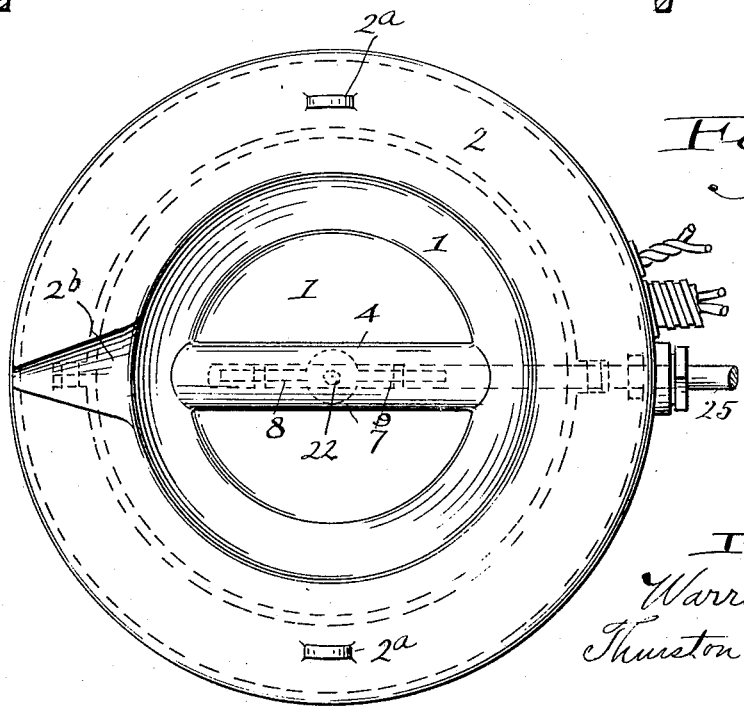

Reference should be had to the accompanying drawings forming a part of this specification, in which Fig. 1 is a sectional elevation; Fig. 2 is a top plan view; Fig. 3 is a sectional elevation at right angles to that shown in Fig. 1; Fig. 4 is a section upon the line 4—4 of Fig. 3; Fig. 5 is an elevation with casing removed of a portion of the temperature controlling device; Fig. 6 diagrammatically represents the electric circuit for the control device and the heating element of the melting pot.

The melting pot is represented at 1, and is of conventional shape and a capacity to suit the requirements. The upper edge of the melting pot is formed as an outwardly extending flange, indicated at 2, which flange at its outer end has a downwardly extending portion, which is indicated at 3.

Extending upwardly within the pot and at the bottom portion thereof is an elongated annular portion 4, this being more particularly shown in Figs. 1 and 3. This part 4 which has been described is preferably made integral with the pot itself, which pot may be made of cast iron or fabricated in any other suitable way. The portion 4 extends transversely of the bottom of the pot, and is hollow, as indicated at 5. The portion 4 is closed at one end, but is open at the other end, as indicated at 6, thereby forming an opening through which a temperature responsive device may be inserted. Extending from the under side of the pot is a downward extension which is indicated at 7, and from this downward extension there are sidewardly extending flanges 8 and 9, the purpose of which members will be subsequently explained.

Inasmuch as the device which is herein described is intended for the melting of Babbitt metal, solder, white metal, wax and similar substances, all of which have the characteristic that they do not circulate while heating, it is therefore necessary to heat the entire surface of the pot, and this is done by providing a wire resistance element which is generally indicated at 10, which is embedded in a material which is plastic when applied to the pot, which plastic material may be alundum or any other material of similar properties.

After the heating element embedded in the plastic material as described has been applied to the outside of the pot, it is baked, so that the heating element is definitely positioned with respect to the melting pot, and its embedding material after baking is hard and rigidly positions the heating element.

In order to protect this heating element against refusage and to prevent its becoming detached from the melting pot, a two part casing is provided, which parts are indicated at 12 and 13 in Fig. 3. These casing members are symmetrical and are adapted to enclose the entire heating element with its embedding material. These casing members are each provided with small wing extensions such as indicated at 14, and are secured to each other by a threaded screw or by any other suitable fastening means.

The casing members at their upper ends are provided with an outwardly extending flange, as indicated at 16. This flange lies against the under side of the outwardly extending flange 2 of the pot, and the flange of the casing is secured to the flange of the pot by means of screws, such as indicated at 17, or in any other desired manner. Thus the outer casing composed of the members 12 and 13 is rigidly and securely fastened to the pot itself.

There is an outer, enclosing, preferably cylindrical member which is indicated at 18. This may be made of sheet metal or any equivalent substance, and is of such size that it fits snugly within the downwardly extending portion 3 of the flange 2. At the lower portion of the cylindrical member 18 there is a base 19 formed with a plurality of depending legs 20 and having an upstanding flange 21 which co-operates with the lower edge of the cylindrical casing 18. The base member 19 is secured to the downwardly extending member 7 which, as before described, is formed as a part of the pot 1, by means of a screw, as indicated at 22, or by any other suitable means. Thus the base is secured directly to the pot.

At portions of the outwardly extending flange 2 of the pot 1 there are upstanding ears 2ª, which upstanding ears are oppositely disposed, and are adapted to receive the ends of a bail 23, by which bail the entire structure may be lifted as a unit and moved from place to place, as may be required. The flange 2 at one portion thereof is depressed, as indicated at 2ᵇ, in order to form a pouring spout by which the contents of the pot may be poured out whenever desired.

Within the cylindrical member 18 there is preferably placed a lining 24 which may be more or less extensive, of high insulating material, such as asbestos air cell sheeting, or any other material which is appropriate for the purpose.

Extending within the hollow portion 5 of the member 4 is a tubular member 25, which is adapted to contain a readily volatile substance. This tubular member extends outwardly through the casing 18, and is suitably held by means of a gland nut structure, generally represented at 26. This tubular member 25 co-operates with a Bourdon tube element, indicated at 26ª, which is carried within the casing 27 of the temperature regulating device. In other words, the tubular member 25, while containing volatile liquid, is a closed system, so that expansion of the volatile liquid within the tube 25 will cause expansion of the Bourdon tube 26, and vice versa, in a manner which is well known. The Bourdon tube at the end thereof is provided with a pin 28 which extends beneath a contact lever 29 carrying a contact point 30, which contact point engages with another contact point 31 which in turn is carried upon a supporting member 32. The lever 29 is either inherently spring-pressed, or may have an additional spring member 33 associated therewith. The members 29 and 32 upon which the contact points are mounted are carried by an insulating block 34 which in turn is adjustably mounted within the casing 27.

It will be obvious that as the liquid within the Bourdon tube is expanded the pin 28 will be caused to rise and move the contact points 30, 31, apart, and vice versa. The contact points 31 and 30 are connected with binding posts 35 and 36, and in turn the conductors connected with the electric circuit for energizing the coil are connected. The electrical connections are not of importance, and the diagram which is shown in Fig. 6 indicates the manner in which the electrical connections are made and connected with the circuit C, C' by which the heating element is energized.

Having described my invention, I claim:—

1. A melting pot comprising a receptacle, an electric heating element surrounding substantially the entire outer surface of the melting pot, a material in which the heating element is embedded, a protecting casing surrounding the said material an outer casing having a base and a wall enclosing the pot and its protecting casing, and means for supporting the pot and protecting casing within the outer casing with the side and bottom walls thereof spaced from the base and enclosing walls of the outer casing.

2. A melting pot comprising a receptacle, an electric heating element embracing substantially the outer surface of the pot, material in which the said heating element is embedded, a casing surrounding said material, and means for securing the said casing to the pot, an outer casing having a base and a wall enclosing the pot and its protecting casing, and means for supporting the pot and protecting casing within the outer casing with the side and bottom walls thereof spaced from the base and enclosing walls of the outer casing.

3. A melting pot comprising a receptacle having an upwardly extending flange at the top portion thereof, an electric heating element embracing substantially the entire outer surface of the receptacle, material in which the heating element is embedded, a two-part casing surrounding the said material, means for securing the parts of the casing together, said casing having a flange at the upper portion thereof, and means for securing said flange to the flange of the receptacle.

4. A melting pot comprising a receptacle having at its upper portion an outwardly extending flange and at its lower portion a downwardly extending projection, an electric heating element embracing substantially the entire outer surface of the said receptacle, a base member which is secured to the downwardly extending projection, and a cylindrical member extending between the base member and the flange on the receptacle.

5. A melting pot comprising a receptacle, a heating element for heating said receptacle, a base, and a wall surrounding said receptacle disposed between the upper portion of the receptacle and said base, said wall being maintained in its relative position by a connection between the under portion of the receptacle and said base.

6. A melting pot comprising a receptacle having at its upper end an outwardly extending flange in which is formed a pouring spout said flange having at the extremity a downwardly turned portion, the receptacle having an extension at the lower portion thereof, a base member having a flanged portion at its periphery, said base portion being secured to the downwardly extending portion of the melting pot, and a cylindrical casing extending between the inside of the flange on the base and the downwardly turned portion of the flange on the receptacle.

7. A melting pot comprising a receptacle having at its upper end an outwardly extending projection and on its under side a downwardly extending portion, an electric heating element embracing substantially the entire outer surface of the said receptacle, material in which the said electric heating element is embedded, a casing surrounding said material, said casing being secured to the outwardly extending flange of the receptacle, a base member secured to the downwardly extending projection from the receptacle, and a cylindrical casing extending between the base portion and the flange on the receptacle and maintained in its relative position by the connection between the downwardly extending projection and said base member.

8. A melting pot comprising a receptacle, said receptacle having a bottom member with a recess therein, an electric heating element adapted to heat the receptacle, a temperature responsive means extending within the recess in the member at the bottom of the receptacle, said temperature responsive means including a movable element, and controlling means for controlling the functioning of the heating means which in turn is controlled by the movable member of the temperature responsive means.

9. A melting pot comprising a receptacle having at the inside bottom portion an upwardly extending projection which extends substantially across the bottom of the receptacle, the said projection having a recess within the same, a heating element adapted to heat the receptacle, a temperature responsive means occupying the said recess and including a movable element, means controlling the functioning of the heating element and operative connections whereby the movable element of the temperature responsive device controls the functioning of the heating element.

10. A melting pot comprising a receptacle, an electric heating element adapted to heat the receptacle, a temperature responsive device extending within the receptacle and subject to the heating effect of material which is at the bottom of the receptacle, means for protecting said temperature responsive means from contact with the metal, said temperature responsive means including a movable element, means controlling the functioning of the heating element, and operative connections whereby the movable element of the temperature responsive device controls the functioning of the heating element.

In testimony whereof, I hereunto affix my signature.

WARREN F. CLARK.